United States Patent [19]

Jordan

[11] 4,173,209
[45] Nov. 6, 1979

[54] ENGINE CONTROL SYSTEM AND VALVE DEACTIVATOR THEREOF

[76] Inventor: Edgar R. Jordan, 32260 W. Twelve Mile Rd., Farmington Hills, Mich. 48018

[21] Appl. No.: 861,377

[22] Filed: Dec. 16, 1977

Related U.S. Application Data

[62] Division of Ser. No. 815,743, Jul. 14, 1977.

[51] Int. Cl.² .............................................. F02D 13/06
[52] U.S. Cl. .............................. 123/198 F; 123/90.43; 123/90.46; 123/978
[58] Field of Search .............. 123/198 F, 97 B, 90.12, 123/90.16, 90.41, 90.43, 90.46

[56] References Cited

U.S. PATENT DOCUMENTS

| | | | |
|---|---|---|---|
| 3,756,205 | 9/1973 | Frost | 123/198 F X |
| 3,809,033 | 5/1974 | Cartledge | 123/90.46 |
| 3,964,455 | 6/1976 | Brown | 123/90.43 |
| 4,050,435 | 9/1977 | Fuller | 123/198 F |
| 4,061,055 | 12/1977 | Lizuha et al. | 123/198 F X |

*Primary Examiner*—Ira S. Lazarus
*Attorney, Agent, or Firm*—Reising, Ethington, Barnard, Perry & Brooks

[57] ABSTRACT

An internal combustion engine control system in which intake and exhaust valve deactivators are controlled in response to both engine throttle position and output speed in order to affect split engine operation. Voltages responsive to both throttle position and engine output speed are compared to generate a variable signal that controls the valve deactivators. Each deactivator includes a rotatable first cylindrical member axially fixed on an elongated engine support and also includes a second cylindrical member defining an enclosed cavity with the first member while positioned on the support between the engine and the first member. A helical spring of each deactivator encircles the cylindrical members thereof and has a first end axially fixed relative to the support and a second end that biases a rocker arm bearing toward the engine. Ports of the support and the first cylindrical member define inlet and exhaust passages to the cavity with the first cylindrical member in first and second rotational positions so as to allow the supply and exhaustion of pumped engine oil to the cavity in order to position the second cylindrical member and the bearing axially along the support so as to control valve operation. The deactivators associated with the intake and exhaust valves of selected cylinders are sequenced so that the intake valve ceases to operate prior to the cessation of the exhaust valve operation upon deactivation, and the exhaust valve begins to operate prior to the intake valve operation upon subsequent activation of the valves.

6 Claims, 13 Drawing Figures

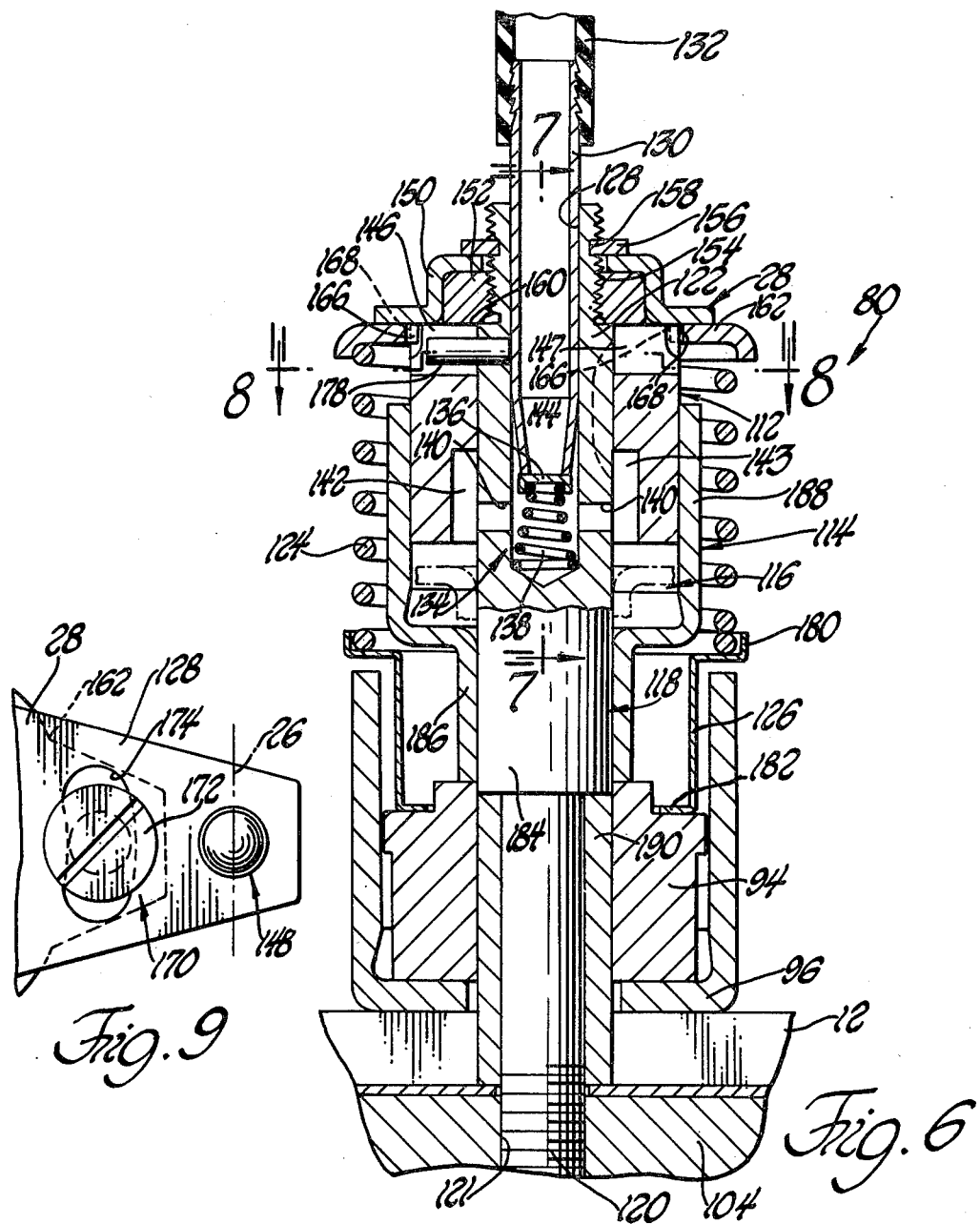
Fig. 9
Fig. 6
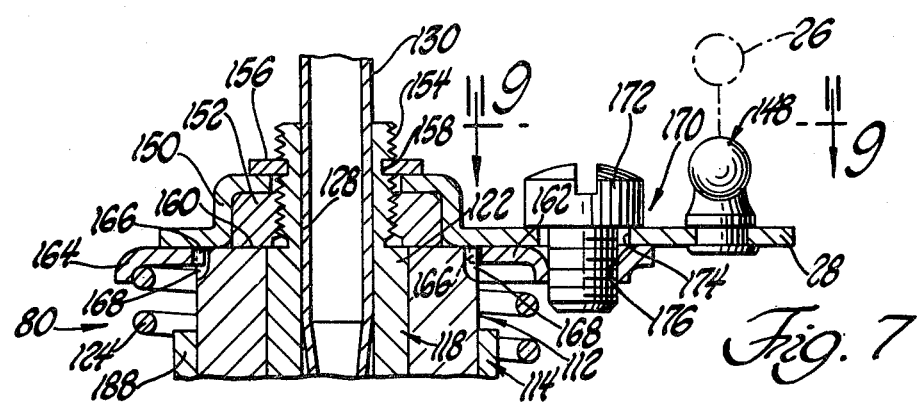
Fig. 7

ENGINE CONTROL SYSTEM AND VALUE DEACTIVATOR THEREOF

This is a division, of application Sr. No. 815,743, filed July 14, 1977.

BACKGROUND OF THE INVENTION

1 Field of the Invention

This invention relates to an internal combustion engine control system for affecting split engine operation and to valve deactivators used with the intake and exhaust valves of the engine to control its operation.

2. Description of the Prior Art

Internal combustion engines that operate in a split engine mode to achieve fuel economy have been previously developed but have yet to achieve wide commercial usage. Selected cylinders of the engine are deactivated during split engine operation so that no fuel is fed to them but rather is fed only to the other cylinders. Intake and exhaust valve deactivators are utilized to provide this control of the cylinder operation. A V-8 cylinder engine will normally have one or two of its cylinders on each bank rendered inoperative by valve deactivators during the split engine operation to provide four or six cylinder operation and will have all eight of its cylinders functioning during full engine operation. Likewise, a V-6 cylinder engine will have one or two cylinders on one or both of its sides operating during split engine operation for two, three, or four cylinder operation and all six cylinders will function during full engine operation.

The U.S. Pat. No. 3,964,455 of Brown discloses a split engine valve deactivator including a movable piston that supports an intermediate portion of the rocker arm of the valve. The piston is located toward the engine from the rocker arm and positioned in an inner position with respect to the engine to locate a push rod end of the rocker arm so that a push rod pivots the rocker arm about a bearing moved by the piston such that a valve actuating end of the rocker arm opens and closes the associated cylinder valve. Positioning of the piston in an outer position with respect to the engine locates the bearing such that telescoping portions of the push rod reciprocate with respect to each other while a lash spring maintains engagement thereof with the push rod and of the rocker arm, the net result being that no pivoting of the rocker arm takes place and hence no valve opening or closing results despite the push rod movement.

See also U.S. Pat. Nos. 2,745,391; 2,955,750; and 3,874,358.

SUMMARY OF THE INVENTION

An object of the present invention is to provide an internal combustion engine control system for affecting split engine operation in response to throttle position and engine output speed.

Another object of the invention is to provide an improved valve deactivator for an internal combustion engine intake or exhaust valve so as to control valve operation while having a compactly packaged construction, and without requiring any extensive molding or machining of the engine with which the valve is used.

In carrying out the above objects, the valve deactivators are associated with the intake and exhaust valves of certain cylinders to control operation of the valves. A V-8 cylinder engine disclosed has the valve deactivators associated with the front and rear cylinders on one side of the engine and the two center cylinders on the other side of the engine. During full engine operation, all eight cylinders are functioning with their valves opening and closing, while during split engine operation the valves of the cylinders with the deactivators are rendered inoperative so as to achieve fuel economy. Operation of the valve deactivators is controlled by first and second sensors that generate variable signals. The first sensor generates a variable signal responsive to engine throttle position while the second sensor generates a variable signal responsive to engine output speed. A comparator of the system compares the signals of the first and second sensors and generates a variable output signal that controls an actuator for operating the valve deactivators.

In the preferred embodiment of the control system disclosed, the first sensor is a potentiometer that generates a voltage proportional to engine throttle position while the second sensor is a dc tachometer that generates a voltage proportional to engine output speed. The comparator compares the two voltages to control the valve deactivation of certain cylinders independently of other cylinders and concomitantly therewith in response to the magnitude of the output signal of the comparator. When utilized with a V-8 cylinder engine, all eight cylinders operate under heavy-load conditions, while six cylinders operate under medium-load conditions, and only four cylinders operate under light-load conditions. Of course, a six or four cylinder engine could also utilize this system in a similar manner with the number of cylinders controlled by the deactivators appropriately selected.

The improved valve deactivator disclosed includes first and second cylindrical members encircled by a helical biasing spring and mounted on the outer end of an elongated support whose inner end is supported on the engine. An intermediate portion of the support mounts a bearing for a valve rocker arm. One end of the spring is axially fixed with respect to the support and with respect to the first cylindrical member which is rotatable between first and second positions to control the deactivator operation. The other end of the spring biases the bearing toward the engine to provide lash take-up during deactivation of the valve. In the first position of the first cylindrical member, ports thereof and of the support define an inlet passage that supplies pressurized fluid to a cavity defined by the first and second cylindrical members. This pressurized fluid moves the second cylindrical member and the bearing toward the engine so that the rocker arm is positioned for normal valve operation. In the second position of the first cylindrical member, ports of the support and the first cylindrical member define an exhaust passage that exhausts the pressurized fluid in order to permit outward movement of the second cylindrical member so that the bearing positions the rocker arm for pivoting about its valve actuating end upon reciprocation of its push rod end with the helical spring providing the lash take-up. An axial hole in the elongated support feeds the pressurized fluid to the cavity through the inlet passage and includes a check valve that prevents reverse fluid flow.

Pumped engine oil can be utilized as the pressurized fluid which controls the deactivator operation in order to provide an economical and low maintenance system. Other valve deactivators, such as the one disclosed by the previously mentioned U.S. Pat. No. 3,964,455, require a control fluid of a higher pressure than is present with pumped engine oil. While a vehicle power steering pump generates a sufficient pressure to control this type of deactivator, a separate fluid system is then required and leakage thereof can be a problem since the power steering fluid cannot be mixed with the conventional engine oil that lubricates the valves. However, exhaustion of the engine oil from the cavity of the valve deactivator to the adjacent area about the rocker arm presents no problem since this area is normally lubricated with the engine oil within the conventional rocker arm covers secured to the engine.

A spring fitting of the rocker arm bearing has a flanged portion that seats the inner end of the helical spring which encircles the cylindrical members. A larger diameter portion of the second cylindrical member slidably receives the first cylindrical member to cooperate therewith in defining the cavity while a smaller diameter portion of the second cylindrical member is slidable on an intermediate portion of the elongated support mounted by the engine.

Rotational movement of the first cylindrical member of each deactivator is controlled by a linkage that interconnects the valve deactivators associated with the intake and exhaust valves of each cylinder. Rotational movement of the first cylindrical members and the orientations of the ports thereof definining the inlet and exhaust passages are such that deactivation of the intake valve occurs before deactivation of the associated exhaust valve. Subsequent activation of the exhaust valve takes place before the activation of the associated intake valve as the linkage is moved by the actuator linkage in response to the control signals sent by the system. A crank arm of each deactivator is rotatably fixed to the associated first cylindrical member while a linkage arm thereof is rotatably supported with respect to the first cylindrical member and rotatably secured to the crank arm thereof by an adjustable connection.

The objects, features, and advantages of the present invention are readily apparent from the following detailed description of the preferred embodiment taken in connection with the accompanying drawings.

BRIEF DESCRIPTION OF THE DRAWINGS

FIG. 6 is an enlarged sectional view through the deactivator taken along line 6—6 of FIG. 5;

FIG. 7 is a sectional view of the valve deactivator taken along line 7—7 of FIG. 6;

FIG. 9 is a plan view of the valve deactivator taken along line 9—9 of FIG. 7.

DETAILED DESCRIPTION OF THE PREFERRED EMBODIMENT

Figure 1:
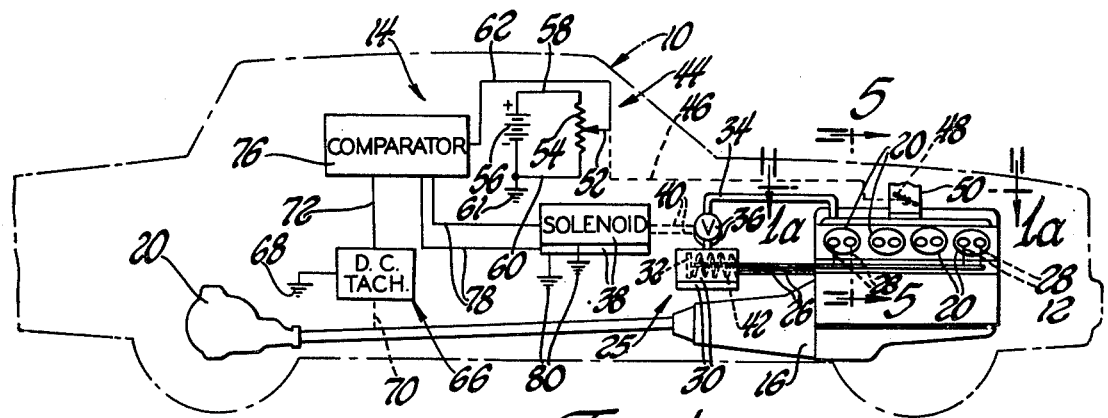
FIG. 1 is a schematic side elevation view of a vehicle incorporating an internal combustion engine control system for affecting split engine operation in accordance with the present invention.

With reference to FIG. 1, a phantom line indicated vehicle 10 includes a V-8 cylinder engine 12 having a control system collectively indicated by 14 for affecting split engine operation in a manner according to the present invention. Engine 12 drives through a transmission 16 whose output is connected to a drive shaft 18 with a rear end coupled to the rear wheel differential 20. Of course, engine system 14 is also usable with a front wheel drive vehicle and the rear wheel drive embodiment disclosed is for illustrative purposes only.

Figure 1A:
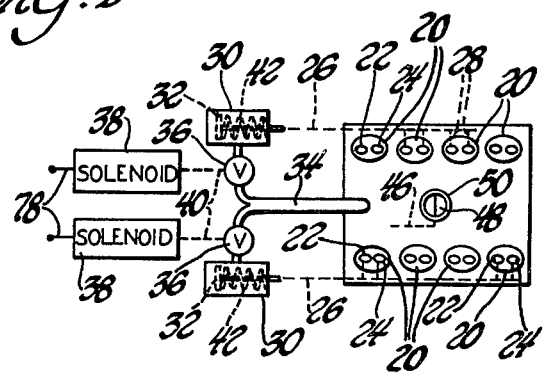
FIG. 1a is a top plan view of the engine taken along line 1a—1a of FIG. 1.

With combined reference to FIGS. 1 and 1a, each of the engine cylinders 20 includes an intake valve 22 and an exhaust valve 24 for feeding combustible charges to these cylinders and for receiving burnt charges therefrom in a conventional manner. The front and rear cylinders 20 on one side of the engine and the two middle cylinders on the other side of the engine include valve deactivators whose structure for affecting split engine operation will be subsequently described. An actuator collectively indicated by 25 for operating the valve deactivators includes linkages 26 with link arms 28 connected to each of the valve deactivators. Rear ends of the linkages extend into vacuum cylinders 30 and are connected to pistons 32 which are sealingly slidable within the cylinders. Engine vacuum is fed through a Y-shaped conduit 34 whose branches include respective control valves 36 operated by associated solenoids 38 through mechanical connections 40. When either solenoid 38 is actuated to open its associated control valve 36, engine vacuum is fed into the right side of the associated cylinder 30 to move the piston 32 to the right against the bias of a spring 42. This movement of the piston moves the linkage 26 to the right and thereby causes the linkage arms 28 to pivot and operate the exhaust and intake valve deactivators of the cylinders 20 in a manner hereinafter described.

As can be seen in FIG. 1, the first sensor 44 of the control system 14 is embodied as a potentiometer which has a mechanical linkage connection 46 to the throttle valve 48 of carburetor 50. Opening movement of the throttle valve 48 moves an arm 52 of the potentiometer sensor 44 upwardly along a resistor 54. Battery 56 is connected by wires 58 and 60 to the resistor 54 with the negative side of the battery and wire 60 grounded at 61. As the throttle valve is opened and potentiometer arm 52 moved upwardly, a variable voltage signal is generated and fed to a wire 62 proportional to the opened condition of the throttle. This signal is graphically illustrated by FIG. 2 wherein the voltage signal 64 is in a straight line relationship that has a value of six volts at one-half opened throttle position and twelve volts when the throttle is fully opened. A second sensor 66 of the control system 14 is embodiment as a dc tachometer that is grounded at 68 and mechanically connected at 70 to the vehicle drive shaft 18 or any other suitable location such as the distributor for sensing engine output speed. A wire 72 is fed a variable voltage signal from the tachometer sensor 66 as shown by the graphical representation of FIG. 3. Voltage signal 74 increases in a straight line relationship proportional to vehicle speed so as to reach twelve volts at sixty miles per hour, which corresponds to an engine speed of about 5000 revolutions per minute.

A grounded comparator 76 of the control system 14 is shown in FIG. 1 connected to the wire 62 of the first sensor 44 and connected with the wire 72 of the second sensor 66. Conventional electrical circuitry of the comparator 76 compares the two voltage signals 64 and 74 shown in FIGS. 2 and 3 of the first and second sensors, respectively, and controls the two solenoids 38 in response to the voltage difference sensed between these signals. This voltage difference is variable in accordance with the condition of engine operation and represents an output signal of the comparator. Each of the solenoids 38 is connected by an associated wire 78 to the comparator and is grounded at 80 so that a control voltage supplied to the wire energizes the solenoid.

Figure 2:
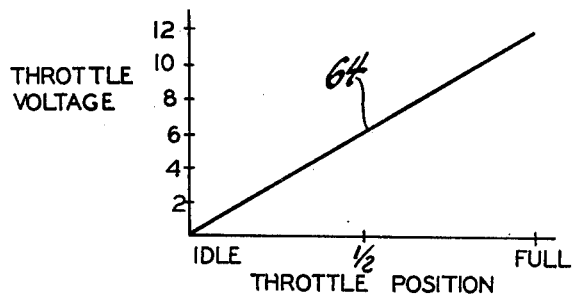
FIG. 2 is a graph showing a variable voltage signal that is sensed by a first sensor of the system proportional to the extent of the opened throttle condition.
Figure 3:
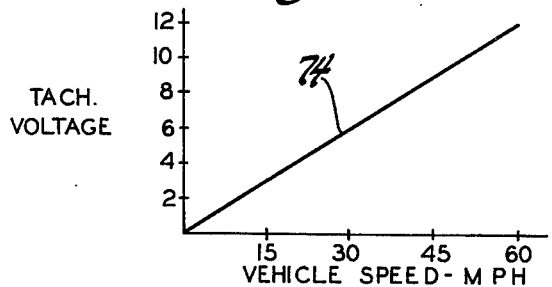
FIG. 3 is a graph of a second variable signal that is sensed by a second sensor of the system proportional to engine output speed.

When the comparator 76 shown in FIG. 1 senses the throttle voltage 64 shown in FIG. 2 as being one volt or more greater than the tachometer voltage 74 shown in FIG. 3, the vehicle engine operates with all eight cylinders. But, when the throttle voltage is greater than the tachometer voltage by less than one volt, one of the solenoids 38 is actuated so that the valves of the two cylinders associated therewith are deactivated to thereby provide six cylinder operation of the engine. A throttle position voltage equal to or less than the tachometer voltage sensed by the comparator causes both of the solenoids to be energized so that the four cylinders having valve deactivators are all rendered inoperative to provide four cylinder operation of the engine. It should be understood that the solenoids may be identical and supplied different energization voltages by their respective wires 78 in order to provide this selective solenoid operation. On the other hand, the wires 78 may provide the same voltage from the comparator and the solenoids may have a different level of voltage requiring energization to deactivate the associated cylinder valves.

Figure 4:
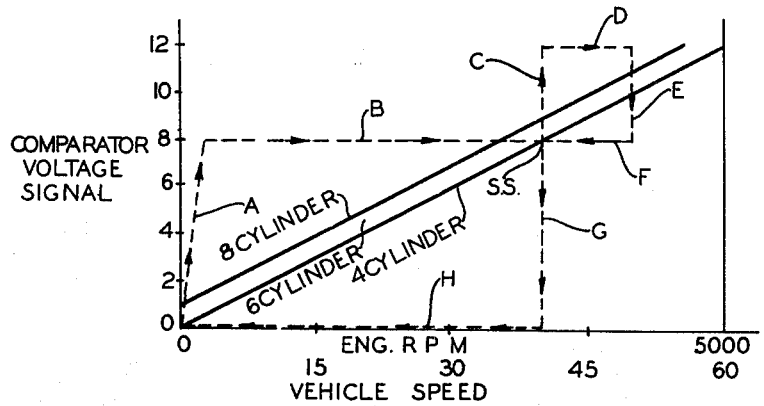
FIG. 4 is a graph showing the manner in which a comparator of the system compares the first and second sensed signals illustrated in FIGS. 2 and 3 in order to control the valve deactivators that affect split engine operation.

FIG. 4 shows a driving sequence beginning with an idle condition at the origin. As the accelerator pedal is depressed along a line A to a two-thirds open position corresponding to eight volts, vehicle speed initially increases relatively slowly. Due to the difference between the throttle and speed voltages of greater than one volt, the control system solenoids will be deactuated and all eight cylinders will then be operating. Speed subsequently increases along a line B as the throttle remains at a constant position with all eight cylinders continuing to operate. When the speed increases sufficiently so that the difference between the throttle and speed voltages is less than one volt, the comparator will actuate one of the solenoids 38 so that two cylinders are deactivated and six cylinder operation will then take place. Speed continues to increase during six cylinder operation until the throttle and speed voltages are equal at the steady state point of S.S., i.e. about 40 miles per hour. The other solenoid 38 is then energized by the comparator 76 so that two more cylinders are deactivated and four cylinder engine operation thus occurs. Subsequent depression of the throttle to the fully opened condition such as for passing causes movement along a line C as the vehicle speed lags and increases very slowly if at all. One of the control system solenoids is very rapidly deenergized and a brief period of six cylinder operation takes place before the other solenoid is also deenergized for eight cylinder operation during the throttle depression. Speed picks up along a line D as the inertia is overcome as the eight cylinder engine operation continues. Releasing the throttle from the fully opened condition to the two-thirds opened condition then causes movement along a line E briefly back through the six cylinder operation into the four cylinder operation prior to the vehicle decelerating along line F back to the steady state condition at point S.S. A subsequent full release of the accelerator pedal and throttle movement to its idle position causes an initial movement along line G and then along H as speed decreases during movement back to the origin.

Figure 5:
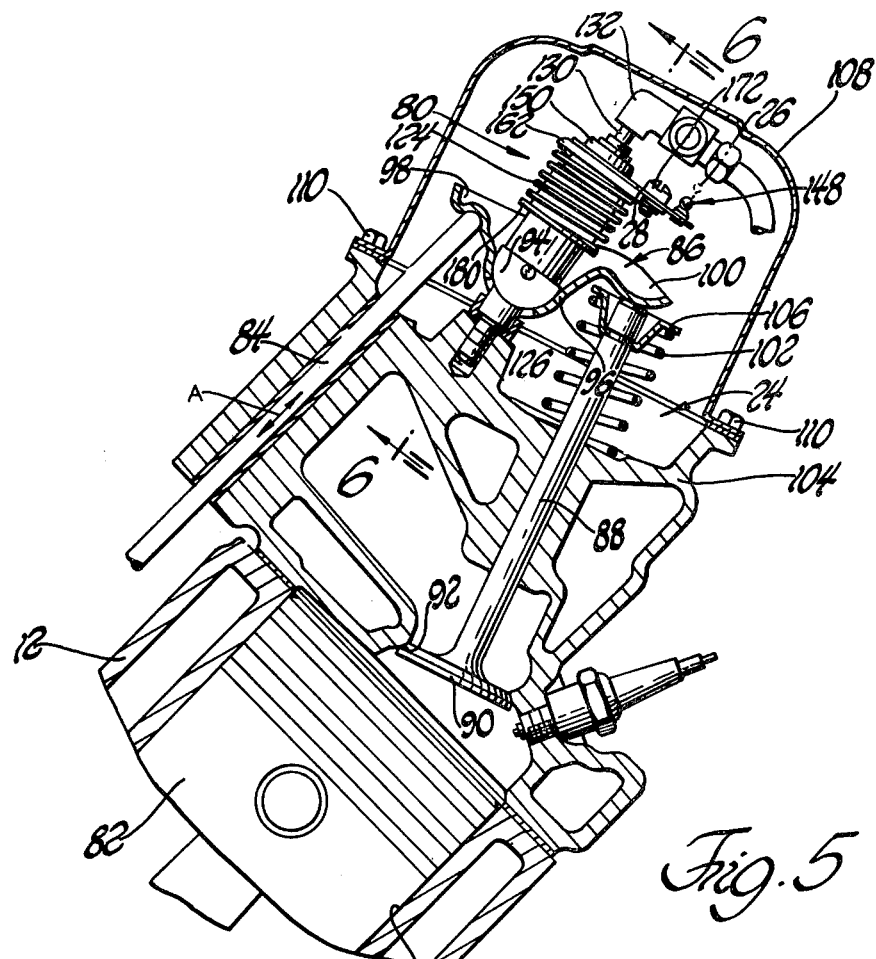
FIG. 5 is a sectional view taken along line 5—5 of FIG. 1 through the engine showing one valve deactivator.

Referring to FIG. 5, a valve deactivator 80 of this invention is shown with an exhaust valve 24 associated with one of the cylinders 20 to control valve operation during reciprocal movement of the piston 82 within the cylinder. The valve deactivator controlling the associated intake valve has the same structure as the exhaust valve deactivator shown as do the other deactivators except for differences which will be subsequently noted. Reciprocal movement of a solid push rod 84 along arrow A actuated by an unshown cam shaft pivots a rocker arm 86 so as to reciprocate a valve stem 88 whose lower end carries the valve head 90 that opens and closes the valve opening 92 to the cylinder. A bearing 94 of the deactivator 80 pivotally supports an intermediate portion 96 of the rocker arm with its push rod and valve actuating ends 98 and 100, respectively, maintained in engagement with the upper ends of the push rod 84 and the valve stem 88. Helical spring 102 has one end seated against the engine head 104 and another end seated against a fitting 106 on the valve stem. Rocker arm cover 108 is secured to the engine head by bolts 110 to enclose the exhaust valve 24 and its associated deactivator 80 as well as the other valves and deactivators on the same side of the engine.

With reference to FIG. 6, first and second round cylindrical members 112 and 114 of the valve deactivator 80 are sealingly slidable in an axial relationship with respect to each other to define an enclosed cavity 116 whose volume varies as the sliding takes place. An elongated support 118 of the deactivator includes a threaded inner end 120 received by a threaded hole 121 of the engine head 104 so as to project outwardly through the bearing 94 as well as axially through the first and second cylindrical members 112 and 114 along their direction of movement relative to each other. An outer end 122 of support 118 rotatably supports the first cylindrical member 112 for movement between first and second positions in a manner that is subsequently described while being axially fixed at the location shown. Pressurized fluid received with the cavity 116 locates the second cylindrical member 114 in the inner position shown with respect to the engine so that the rocker arm bearing 94 is located inwardly as shown in both FIGS. 5 and 6 by solid line representation such that actuation of exhaust valve 24 shown in FIG. 5 takes place. Exhaustion of the pressurized fluid within the cavity 116 (FIG. 6) allows outward movement of the second cylindrical member 114 under the impetus of the outward movement of push rod 84 (FIG. 5) such that the rocker arm pivots about its valve actuating end 100 without opening and closing the valve due to the valve spring 102. As the deactivated valve remains closed with the rocker arm 86 pivoting about its end 100, a helical spring 124 that encircles the first and second cylindrical members flexes so as to provide lash takeup. One end of spring 124 is axially fixed with respect to the elongated support 118 while the other end of the spring is seated by a spring fitting 126 that engages the rocker arm bearing 94. Spring 124 has a bias which is relatively light in comparison to the bias of the valve closure spring 102 so that the valve remains closed with spring 124 flexing in the valve deactivated condition.

The outer end of support 118 is shown in FIG. 6 as having an axial hole 128 through which a tube 130 extends to supply pumped engine oil through a hose coupling 132 to the cavity 116. A check valve 134 with a valve element 136 biased upwardly against the lower end of tube 130 by a spring 138 prevents reverse flow of the pumped engine oil from the cavity 116 upwardly back through the tube.

Figure 8A:
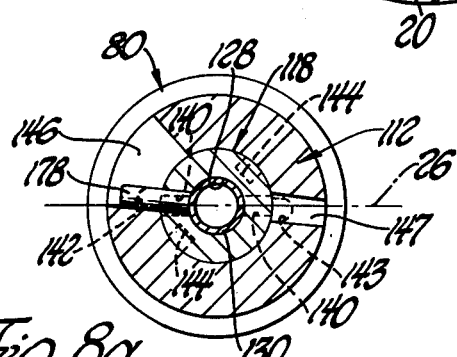
FIGS. 8a, 8b, 8c, and 8d are sectional views through valve deactivators taken in the direction of line 8—8 in FIG. 6, FIG. 8a showing an exhaust valve deactivator in its valve activated condition, FIG. 8b showing the exhaust valve deactivator in its valve deactivated condition, FIG. 8c showing an intake valve deactivator associated with the exhaust valve deactivator in its valve activated condition, and FIG. 8d showing the intake valve deactivator in its valve deactivated condition.

As seen in FIGS. 6 and 8a, diametrically opposed ports 140 in the elongated support 118 cooperate with ports 142 and 143 in the first cylindrical member 112 with this member located in a first rotational position thereof in order to define an inlet passage through which the pumped engine oil is fed from the tube 130 into the cavity 116. As this pumped fluid is fed into the cavity 116, the second cylindrical member 114 is positioned in its solid line indicated inward position in FIG. 6 in order to position the rocker arm bearing 94 inwardly with respect to the engine and maintin the rocker arm 86 in a position for actuating the associated engine valve. Rotational movement of the first cylindrical member 112 to a second rotational position thereof shown by FIG. 8b aligns the ports 142 and 143 thereof with the lower ends of diametrically opposed vertically extending ports 144 in the elongated support 118. Upper ends of ports 144 respectively communicate with upper exhaust ports 146 and 147 of the first cylindrical member so that all of these ports define an exhaust passage in the second rotational position of the first cylindrical member 112. The inlet passage for pumped oil to the cavity 116 is then closed so that the second cylindrical member 114 can move upwardly to the phantom line position shown in FIG. 6 as engine oil is forced out of both ports 146 and 147 and splashed about the valves under the valve cover 108 shown in FIG. 5. As the push rod 84 reciprocates with the deactor 80 in this exhausted condition, the rocker arm 86 pivots about its valve actuating end 100 with its push rod end 98 moving upwardly and downwardly. The intermediate portion 96 of the rocker arm also moves upwardly and downwardly with the helical spring 124 providing lash take-up. Frictional forces involved will maintain the second cylindrical member 114 upwardly in the phantom line indicated position of FIG. 6 in a generally stationary manner. No actuation of the engine valves take place under this exhausted condition of the cavity 116. On the other hand, engine oil pumped into the cavity 116 positions the second cylindrical member 114 downwardly in its solid line indicated position of FIG. 6 so that the reciprocal movement of the push rod 84 (FIG. 5) pivots the rocker arm 86 to open and close the exhaust valve 124.

As seen best in FIG. 7, the linkage 26 which connects the deactivators 80 on each side of the engine is connected to the outer end of linkage arm 28 by a schematically indicated ball and socket connection 148. An inner end of linkage arm 128 is formed with a downwardly opening support portion 150 of a round shape that receives a round nut 152 threaded onto an upwardly projecting threaded portion 154 of the support outer end 122. An omega-shaped retainer 156 is received by a groove 158 in the threaded portion 154 to prevent unthreading and outward movement of the linkage arm 28. Engagement of the upper surface 160 of cylindrical member 112 with the lower side of nut 152 limits outward axial movement of the first cylindrical member while permitting rotation thereof about the support 118. A crank arm 162 is located below the linkage arm 28 and has a flanged periphery 164 that seats the upper end of helical spring 124. A central opening of the crank arm 162 includes splines 166 that are intermeshed with splines 168 on the upper end of cylindrical member 112 so that the crank arm 162 is rotatably fixed to this cylindrical member. An adjustable connection 170 rotatably fixes the linkage arm 28 and the crank arm 162 to each other. Screw 172 of the connection extends downwardly through an arcuate slot 174 (See also FIG. 9) in the linkage arm 28 into a threaded hole 176 in crank arm 162. Loosening of the screw 172 allows the linkage arm 28 to be rotatably adjusted with respect to the crank arm 162 and thus with respect to the cylindrical member 112. Tightening of screw 172 rotatably fixes the linkage arm 28 with respect to the crank arm 162 and hence with respect to the cylindrical member 112.

Figure 8B:
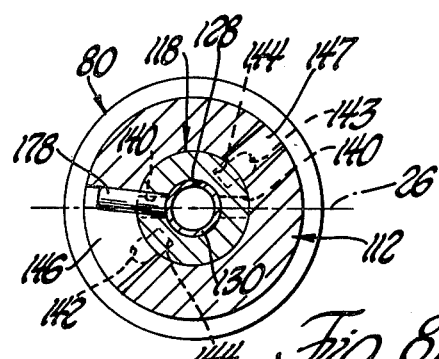
Figure 8C:
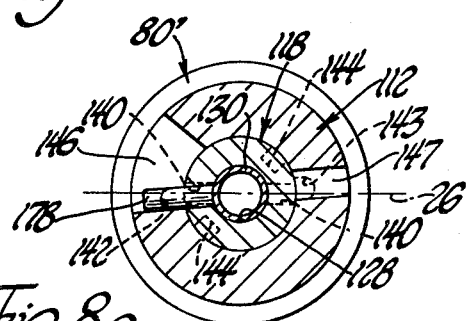
Figure 8D:
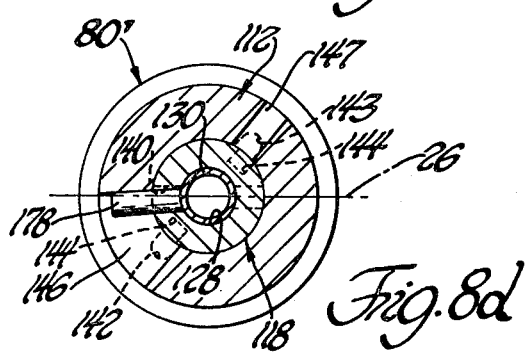

The exhaust valve deactivator 80 shown in FIGS. 8a and 8b includes a pin 178 that projects radially from support 118 within port 146 of cylindrical member 112. Engagement of the pin 178 with the opposite sides of the port 146 limits the rotational movement of cylindrical member 112 under the impetus of the linkage 26 between the first inlet position of FIG. 8a and the second exhaust position of FIG. 8b. It will be noted that the pin 178 is located to one side of the centerline of linkage 26 by an angle of approximately five degress. Another valve deactivator indicated by 80' in FIGS. 8c and 8d is used with the intake valve that cooperates with the exhaust valve deactivator 80 shown in FIGS. 8a and 8b at the same piston cylinder. Deactivator 80' has the same construction as the deactivator structure previously described except for the orientation of its pin 178. As can be seen, this pin 178 is located on the opposite side of the centerline of linkage 26 by an angle of about five degrees. The orientation of the exhaust valve and intake valve deactivator pins 178 sequences the deactivators 80 and 80' so that the intake valve operation begins after exhaust valve operation begins upon activation of the valves and so that exhaust operation terminates after intake valve operation has already terminated upon deactivation. This sequencing prevents a combustible charge from being ignited when the operation of the cylinder is in a transition stage with its exhaust valve closed.

With reference to FIGS. 8a and 8c, cylindrical member 112 of the exhaust valve deactivator 80 is located approximately ten degrees clockwise from the cylindrical member 112 of the intake valve deactivator 80'. As such, as the members 112 are rotated clockwise with each other by linkage 26 from their valve deactivated positions respectively shown by FIGS. 8b and 8d, the exhaust valve deactivator inlet ports 142 and 143 move into alignment with the stationary ports 140 prior to the alignment of these same ports for the intake valve deactivator. As such, the exhaust valve begins to operate before the intake valve. Similarly, as the cylindrical members 112 of the deactivators 80 and 80' rotate counterclockwise to provide valve deactivation, the ports 144 of the intake valve deactivator are aligned with the ports 142, 146 and 143, 147 before these same ports of the exhaust valve deactivators so that the intake valve terminates operation before the exhaust valve. Thus, during the transition between valve operation and deactivation and between valve deactivation and operation, there are no times at which a burnt charge ignited within the cylinder cannot escape through the exhaust valve due to prior deactivation or a lagging of its activation.

It should be noted that the spring fitting 126 shown in FIG. 6 has an upper end with an angular flange 180 seating the lower end of the helical spring 124 which provides lash takeup during valve deactivation. A lower end 182 of spring fitting 126 also has an annular shape that engages the rocker arm bearing 94 under the bias of the spring 124. An intermediate portion 184 of the elongated support 118 has a close sliding fit with a smaller diameter portion 186 of the second cylindrical member 114. A larger diameter portion 188 of cylindrical member 114 slidably receives the first cylindrical member 112 in a sealed relationship. With the cavity 116 of the deactivator exhausted, friction involved between the support intermediate portion 184 and the smaller diameter portion 186 of cylindrical member 114 as well as the friction between the larger diameter portion 188 of cylindrical member 114 and the cylindrical member 112 maintains the cylindrical member 114 in this upward position against the downward bias of gravity as the intermediate portion 96 of the rocker arm moves upward and downwardly along a sleeve bearing 190 that encircles the lower support end 120.

While the preferred embodiment of the internal combustion split engine control system and valve deactivator thereof have herein been described in detail, those skilled in the art will recognize various alternative designs and embodiments for practicing the present invention as described by the following claims.

What is claimed is:

1. In an internal combustion engine that is throttle operated to control output speed and which includes a plurality of piston cylinders with respective intake and exhaust valves associated therewith for feeding combustible charges to the cylinders and for receiving burnt charges therefrom, an engine control system comprising: valve deactivators associated with the intake and exhaust valves of certain cylinders to control operation thereof; each deactivator having a member movable to a first position where the associated valve operates and to a second position where the associated valve is deactivated; a first sensor for generating a variable signal responsive to engine throttle position; a second sensor for generating a variable second signal responsive to engine output speed; a comparator that compares the signals of the first and second sensors and generates a variable output signal responsive thereto; and actuator means for controlling the valve deactivators in response to the output signal of the comparator such that the movable member of each intake valve deactivator is moved to the first position thereof after the movable member of the associated exhaust valve deactivator is moved to the first position thereof and such that the movable member of each exhaust valve deactivator is moved to the second position thereof after the movable member of the associated intake valve deactivator is moved to the second position thereof.

2. In an internal combustion engine that is throttle operated to control output speed and which includes a plurality of piston cylinders with respective intake and exhaust valves associated therewith for feeding combustible charges to the cylinders and for receiving burnt charges therefrom, an engine control system comprising: valve deactivators associated with the intake and exhaust valves of certain cylinders to control operation thereof; each deactivator having a member movable to an inner position where the associated valve operates and to an outer position where the associated valve is deactivated; a first sensor for generating a voltage proportional to the opened extent of the engine throttle position; a second sensor for generating a voltage proportional to engine output speed; a comparator that compares the voltages of the first and second sensors and generates a variable output signal of the differential voltage therebetween; and actuator means for controlling the valve deactivators in response to the output signal of the comparator such that the movable member of each intake valve deactivator is moved to the inner position thereof after the movable of the associated exhaust valve deactivator is moved to the inner position thereof and such that the movable member of each exhaust valve deactivator is moved to the outer position thereof after the movable member of the associated intake valve deactivator is moved to the outer position thereof.

3. In an internal combustion engine that is throttle operated to control output speed and which includes a plurality of piston cylinders with respective intake and exhaust valves associated therewith for feeding combustible charges to the cylinders and for receiving burnt charges therefrom; an engine control system comprising: valve deactivators associated with the intake and exhaust valves of certain cylinders to control operation thereof; each deactivator including a member movable between a first position where the associated valve operates and a second position where the associated valve is deactivated; a first sensor for generating a variable signal responsive to engine throttle position; a second sensor for generating a variable signal responsive to engine output speed; a comparator that compares the signals of the first and second sensors and generates a variable output signal responsive thereto; and actuator means for moving the member of each valve deactivator between the first and second positions thereof in response to the signal of the comparator in order to control valve operation; the actuator means including a mechanical connection between the members of the deactivators associated with the intake and exhaust valves of each piston cylinder such that the member of the intake valve deactivator is moved to the first position after the member of the exhaust valve deactivator and such that the member of the exhaust valve deactivator is moved to the second position after the member of the intake valve deactivator.

4. A control system as in claim 3 wherein the actuator means includes at least two actuators for controlling the valve deactivators of selected cylinders independently from the valve deactivators of other cylinders and concomitantly therewith in response to the output signal of the comparator.

5. In an internal combustion engine that is throttle operated to control output speed and which includes a plurality of piston cylinders with respective intake and exhaust valves associated therewith for feeding combustible charges to the cylinders and for receiving burnt charges therefrom, an engine control system comprising: valve deactivators associated with the intake and exhaust valves of selected cylinders to control operation thereof; each deactivator including a member movable between a first position where the associated valve operates and a second position where the associated valve is deactivated; a first sensor for generating a voltage proportional to engine throttle position; a second sensor for generating a voltage proportional to engine output speed; a comparator that compares the voltages of the first and second sensors and generates a voltage signal responsive thereto; actuator means for moving the members of the valve deactivators between the first and second positions thereof in response to the voltage signal of the comparator in order to control valve operation; and said actuator means including a linkage that connects the members of the deactivators associated with the intake and exhaust valve of each selected cylinder, the linkage moving the member of each intake valve deactivator to the first position after the member of the associated exhaust valve deactivator is moved to the first position, and the linkage moving the member of each exhaust valve deactivator to the second position after the member of the associated intake valve is moved to the second. position.

6. A system as in claim 5 wherein the linkage includes an adjustable connection with each member of the valve deactivators.

* * * * *